(12) United States Patent
Dunphy et al.

(10) Patent No.: US 7,751,677 B2
(45) Date of Patent: Jul. 6, 2010

(54) OPTICAL FIBER FEEDTHROUGH USING AXIAL SEALS FOR BI-DIRECTIONAL SEALING

(75) Inventors: James R. Dunphy, South Glastonbury, CT (US); George J. Talmadge, Clinton, CT (US); John J. Grunbeck, Northford, CT (US); Khai Tran, Pearland, TX (US); Roddie R. Smith, Cypress, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 12/050,655

(22) Filed: Mar. 18, 2008

(65) Prior Publication Data

US 2008/0166099 A1 Jul. 10, 2008

Related U.S. Application Data

(63) Continuation-in-part of application No. 11/172,616, filed on Jun. 30, 2005.

(51) Int. Cl.
*G02B 6/00* (2006.01)

(52) U.S. Cl. .......................... 385/138; 385/53; 385/134; 385/147

(58) Field of Classification Search .................. 385/53, 385/134, 138, 147
See application file for complete search history.

(56) References Cited

U.S. PATENT DOCUMENTS

| | | | |
|---|---|---|---|
| 3,825,320 A | 7/1974 | Redfern | |
| 4,530,078 A * | 7/1985 | Lagakos et al. | 367/149 |
| 4,682,846 A | 7/1987 | Cowen | |
| 5,024,503 A * | 6/1991 | Gunn et al. | 385/53 |
| 5,309,993 A | 5/1994 | Coon et al. | |
| 5,450,515 A | 9/1995 | Bechtel et al. | |
| 5,844,667 A | 12/1998 | Maron | |
| 6,042,591 A * | 3/2000 | Mears | 606/140 |
| 6,115,528 A | 9/2000 | Schmucker et al. | |
| 6,136,009 A * | 10/2000 | Mears | 606/140 |
| 6,321,021 B1 * | 11/2001 | Cairns et al. | 385/138 |
| 6,436,108 B1 * | 8/2002 | Mears | 606/140 |
| 6,439,055 B1 | 8/2002 | Maron et al. | |
| 6,445,868 B1 | 9/2002 | Grunbeck et al. | |

(Continued)

FOREIGN PATENT DOCUMENTS

EP 0316473 11/1987

(Continued)

OTHER PUBLICATIONS

GB Search Report, Application No. GB0904486.8, dated May 27, 2009.

*Primary Examiner*—Charlie Peng
*Assistant Examiner*—Mary A El Shammaa
(74) *Attorney, Agent, or Firm*—Patterson & Sheridan, LLP

(57) ABSTRACT

An optical waveguide feedthrough assembly passes at least one optical waveguide through a bulk head, a sensor wall, or other feedthrough member. The optical waveguide feedthrough assembly comprises a cane-based optical waveguide that forms a glass plug sealingly disposed in a feedthrough housing. A seal fills an annular space between the glass plug and the housing. The seal may be energized by a fluid pressure in the housing to establish sealing engagement. Further, the seal may provide bidirectional sealing. The feedthrough assembly is operable in high temperature and high pressure environments.

20 Claims, 12 Drawing Sheets

U.S. PATENT DOCUMENTS

| | | | |
|---|---|---|---|
| 6,526,212 B1 * | 2/2003 | Mishriky et al. | 385/138 |
| 7,447,390 B2 * | 11/2008 | Dunphy et al. | 385/12 |
| 2002/0181909 A1 * | 12/2002 | Grunbeck et al. | 385/123 |
| 2004/0165834 A1 | 8/2004 | Bryant et al. | |
| 2004/0165841 A1 | 8/2004 | Fernald et al. | |
| 2007/0003207 A1 | 1/2007 | Dunphy et al. | |
| 2008/0029264 A1 | 2/2008 | Williams et al. | |

FOREIGN PATENT DOCUMENTS

| | | |
|---|---|---|
| GB | 2 427 911 | 10/2007 |
| GB | 2 443 548 | 7/2008 |

* cited by examiner

OPTICAL FIBER FEEDTHROUGH USING AXIAL SEALS FOR BI-DIRECTIONAL SEALING

CROSS-REFERENCE TO RELATED APPLICATIONS

This application is a continuation-in-part of co-pending U.S. patent application Ser. No. 11/172,616, filed Jun. 30, 2005, which is herein incorporated by reference.

BACKGROUND OF THE INVENTION

1. Field of the Invention

Embodiments of the invention relate to feedthroughs for optical waveguides, and more particularly, to hermetically sealed feedthroughs suitable for use in high pressure, high temperature, and/or other harsh environments.

2. Description of the Related Art

In many industries and applications, there exists a need to have optical waveguides penetrate a wall, bulkhead, or other feedthrough member wherein a relatively high fluid or gas differential pressure exists across the feedthrough member. In addition, one or both sides of the feedthrough member may be subjected to relatively high temperatures and other harsh environmental conditions, such as corrosive or volatile gas, fluids and other materials. However, several problems exist that are associated with constructing such an optical fiber feedthrough.

One of these problems relates to susceptibility of glass fiber to damage and breakage due to flexibility based on a small size of the fiber, brittle nature of glass material, and presence of a significant stress concentration at the point where the fiber enters and exits the feedthrough. Another problem with sealing an optical fiber occurs due to fused silica material of which the optical fiber is made having a low thermal expansion rate compared to most engineering materials, including metals, sealing glasses and epoxy. This difference in coefficients of thermal expansion greatly increases the thermal stress problem at any glass-to-sealing material interface. For example, epoxy used to seal and fill around the fiber may due to thermal changes break its bond with surrounding metal surfaces and/or the fiber, thereby creating potential leak paths. Such thermal changes may occur in use, during transport that may be in an aircraft, or even at manufacturing where the epoxy may be molded at increased temperatures prior to cooling.

One technique used to produce optical fiber feedthroughs is the use of a sealed window with an input and an output lensing system. In this technique, the optical fiber must be terminated on each side of a pressure-sealed window, thus allowing the light to pass from the fiber into a lens, through the window, into another lens, and finally into the second fiber. The disadvantages associated with this system include the non-continuous fiber path, the need to provide two fiber terminations with mode matching optics, thus increasing manufacturing complexity and increasing the light attenuation associated with these features.

Therefore, a need exists for an improved optical waveguide feedthrough assembly.

SUMMARY OF THE INVENTION

Embodiments of the invention provide an optical waveguide feedthrough assembly, and a method of making such an assembly, which is capable of relatively long-lasting operation at relatively high pressures and/or temperatures. An optical waveguide feedthrough assembly in one embodiment includes a housing having a bore extending therethrough and an optical waveguide element having a core and cladding at a first section, wherein the first section is disposed in the bore and has a larger cladding outer diameter than a second section. The feedthrough assembly further includes a first sealing element disposed around the first section of the optical waveguide element, wherein the first sealing element has sealing lips oriented to be energized into sealing engagement with the bore and the glass plug by fluid pressure acting in a first direction within the bore. In addition, a second sealing element may surround the first section of the optical waveguide element and have sealing lips oriented to be energized into sealing engagement with the bore and the glass plug by fluid pressure acting in a second direction opposite the first direction within the bore.

An optical waveguide feedthrough assembly for one embodiment includes a housing having a bore extending therethrough and an optical waveguide element having a core and cladding, wherein the optical waveguide element is disposed in the bore and has a cladding outer diameter with a profile defining sections with at least two different diameters. A sealing element disposed around the first section of the optical waveguide element provides sealing engagement with the bore and the glass plug. Further, a containment member secured within the housing includes corresponding features mated with the profile of the optical waveguide element.

In one embodiment, an optical waveguide feedthrough assembly includes a housing having a bore extending therethrough. An optical waveguide element includes a core and cladding at a first section with a larger cladding outer diameter than a second section. The feedthrough assembly further includes the first section disposed in the bore and v-ring seals disposed around the first section of the optical waveguide.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Epoxy-free optical fiber feedthrough assemblies applicable for use in high temperature, high pressure environments are provided. In one embodiment, a feedthrough assembly includes a glass plug disposed in a recess of a feedthrough housing. The glass plug is preferably a large-diameter, cane-based, waveguide adapted to seal the recess in the housing and provide optical communication through the housing. All embodiments described herein provide for sealing with respect to the housing at or around the glass plug of an optical waveguide element passing through the housing.

As used herein, "optical fiber," "glass plug" and the more general term "optical waveguide" refer to any of a number of different devices that are currently known or later become known for transmitting optical signals along a desired pathway. For example, each of these terms can refer to single mode, multi-mode, birefringent, polarization maintaining, polarizing, multi-core or multi-cladding optical waveguides, or flat or planar waveguides. The optical waveguides may be made of any glass, e.g., silica, phosphate glass, or other glasses, or made of glass and plastic, or solely plastic. For high temperature applications, optical waveguides made of a glass material is desirable. Furthermore, any of the optical waveguides can be partially or completely coated with a gettering agent and/or a blocking agent (such as gold) to provide a hydrogen barrier that protects the waveguide. In addition, the feedthrough assemblies can include a single such optical waveguide or may include a plurality of such optical waveguides.

An Exemplary Feedthrough Assembly

Figure 1:
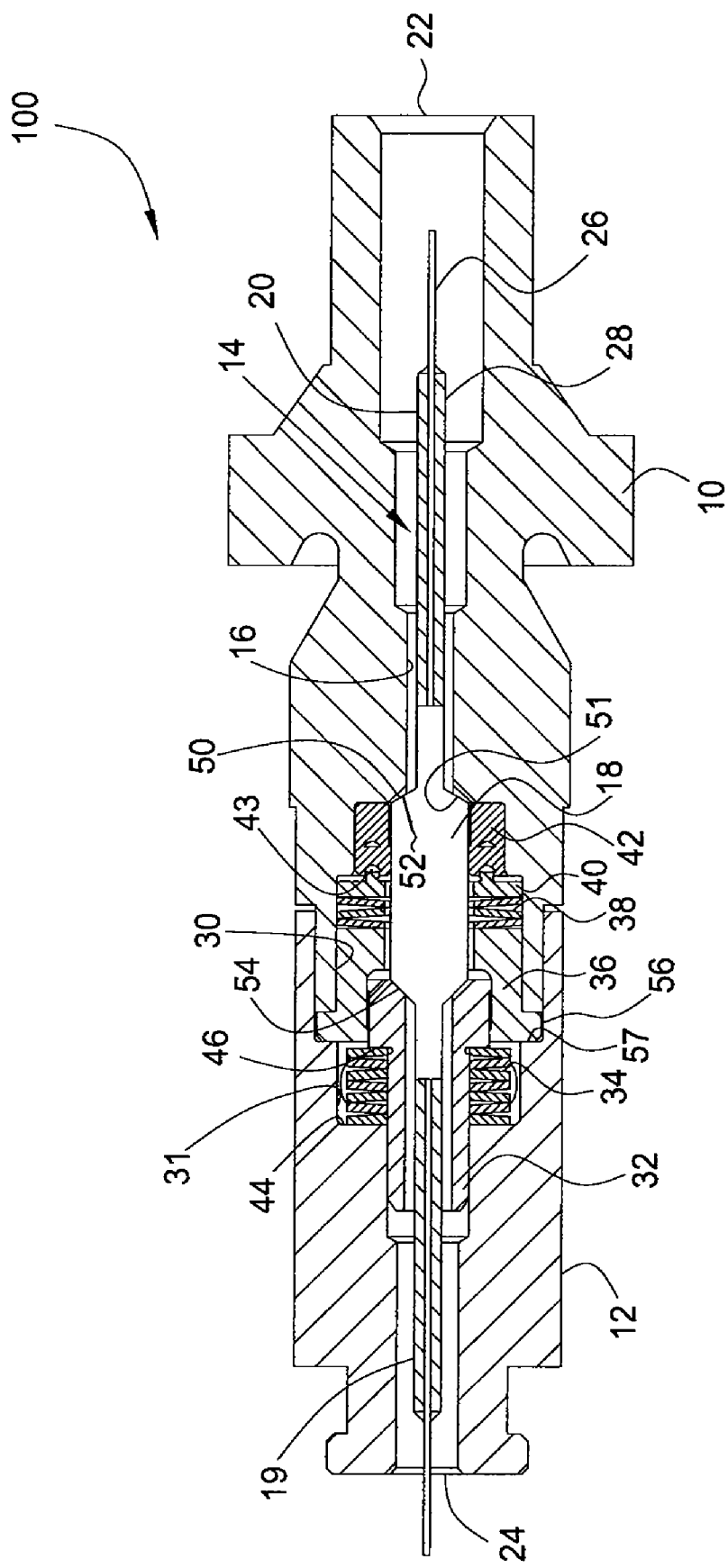
FIG. 1 illustrates a cross section view of an optical waveguide feedthrough assembly.

FIG. 1 shows a cross section view of an optical fiber feedthrough assembly 100 that includes a front housing 10 coupled to a back housing 12. An optical waveguide element 14 passes through a passageway 16 common to both housings 10, 12. The passageway 16 is defined by bores extending across the housings 10, 12. The optical waveguide element 14 includes a glass plug 18 defining a large-diameter, cane-based, optical waveguide with an outer diameter of about 0.3 millimeters (mm) or greater, such as between 0.5 mm and 6.0 mm. The glass plug 18 can have appropriate core and cladding dimensions and ratios to provide the desired outer large-diameter.

For some embodiments, first and second fiber pigtails 19, 20 extend from each end of the glass plug 18. Each of the pigtails 19, 20 preferably include an optical waveguide such as an optical fiber 26 encased or embedded in a carrier 28 or larger diameter glass structure allowing the fiber 26 to be optically coupled to the glass plug 18. U.S. Patent Application Publication Number 2004/0165834, entitled "Low-Loss Large-Diameter Pigtail" and hereby incorporated by reference in its entirety, describes exemplary pigtails that can facilitate subsequent optical connection of the fiber 26 to other fibers, connectors, or other optical components by suitable splicing techniques known in the art. Further, U.S. Application Publication Number 2004/0165841, entitled "Large Diameter Optical Waveguide Splice," which is herein incorporated by reference in its entirety, describes a large-diameter splice suitable for splicing the fiber pigtails 19, 20 to the glass plug 18. For some embodiments, the glass plug 18 can be spliced to or otherwise optically coupled with fibers in optical communication with each end of the glass plug 18 by other techniques and methods.

Sealing of the optical waveguide element 14 with respect to the front housing 10 occurs at and/or around the glass plug 18 to enable isolation of fluid pressure in communication with a first end 22 of the passageway 16 from fluid pressure in communication with a second end 24 of the passageway 16. This sealing of the glass plug 18 with respect to the front housing 10 provides the feedthrough capabilities of the feedthrough assembly 100. In the embodiment shown in FIG. 1, the glass plug 18 has a cone shaped tapered surface 50 for seating against a complimentary tapered seat 51 of the front housing 10. Engagement between the tapered surface 50 and the complimentary tapered seat 51 that is located along the passageway 16 forms a seal that seals off fluid communication through the passageway 16. The glass plug 18 can be machined to provide the cone shaped tapered surface 50. Additionally, the glass plug 18 is preferably biased against the tapered seat 51 using a mechanical preload.

A recess 30 formed in one end of the front housing 10 aligns with a corresponding recess 31 in one end of the back housing 12 where the housings 10, 12 are coupled together. Preferably, the front housing 10 is welded to the back housing 12 along mated features thereof. Materials for the housings 10, 12 depend on the exact application. For example, Inconel 718 may make up the housings 10, 12 for oil field service while more benign applications may utilize a stainless steel. The housings 10, 12 preferably enclose the glass plug 18, a biasing member such as a first stack of Belleville washers 34, and a plunger 32, which are all disposed within the recesses 30, 31.

The first stack of Belleville washers 34 supply the mechanical preload by pressing the plunger 32 onto an opposite end of the glass plug 18 from the tapered surface 50. Since the plunger 32 is moveable with the glass plug 18, this pressing of the plunger 32 develops a force to bias the glass plug 18 onto the tapered seat 51 of the front housing 10 located along the passageway 16 that passes through the front housing 10. Transfer of force from the plunger 32 to the glass plug 18 can occur directly via an interface 54 between the two, which can include mating conical surfaces. The first stack of Belleville washers 34 compress between a base shoulder 44 of the recess 31 in the back housing 12 and an outward shoulder 46 of the plunger 32 upon make-up of the front housing 10 to the back housing 12. Once the back housing 12 is welded or otherwise attached to the front housing 10 in order to keep the front and back housings 10, 12 connected, the first stack of Belleville washers 34 maintains the compression that supplies force acting against the plunger 32.

In some embodiments, the feed through assembly 100 further includes a gasket member 52 disposed between the tapered seat 51 and the tapered surface 50 of the glass plug 18. As shown in FIG. 1, the gasket member 52 comprises an annular gasket. The gasket member 52 may be a gold foil that is shaped to complement the tapered surface 50 and the tapered seat 51. The gasket member 52 deforms sufficiently to accommodate imperfections on the tapered surface 50 and/or the tapered seat 51, thereby completing the seal and reducing stress between contacting surfaces due to any imperfections on the surfaces. Gold is preferred because of its ability to withstand high temperature, its ductility and its inert, non-reactive, non-corrosive nature. However, other materials possessing these characteristics may also be suitable, including aluminum, lead, indium, polyetheretherketone ("PEEK™"), polyimide, other suitable polymers, and combinations thereof.

An additional gasket member (not shown) may be disposed between the interface 54 of the glass plug 18 and the plunger 32 for some embodiments to reduce the surface stress that may occur between these two components. In further embodiments, a layer of gold or other suitable material is deposited on the contact surfaces as an alternative to using the gasket member 52. For example, the gold may be deposited using chemical vapor deposition, physical vapor deposition, plating, or combinations thereof to reduce surface stress and maximize the seal performance. Other embodiments utilize the gasket member 52 punched from sheets of a gasket material.

For some embodiments, the housings 10, 12 additionally enclose a cup-shaped backstop sleeve 36, a second stack of Belleville washers 38, a perforated washer 40, and a centering element 42 that are all disposed within the recesses 30, 31. An outward shoulder 56 of the backstop sleeve 36 is trapped by the end of the front housing 10 and an inward shoulder 57 along the recess 31 in the back housing 12. Contact upon sandwiching of the shoulder 56 of the backstop sleeve 36 provides the point at which the housings 10, 12 are fully mated and can be secured together. Clearance is provided such that the end of the back housing 12 does not bottom out prior to the housings 10, 12 being fully mated.

The centering element 42 includes an elastomeric sealing component disposed between the glass plug 18 and the front housing 10 that can act as a back-up seal in addition to facilitating alignment of the glass plug 18 with respect to the seat 51. Although the centering element 42 is described as providing a back up seal to the tapered surface 50 of the glass plug 18 seated with the gasket member 52 on the complimentary tapered seat 51, the centering element 42 can be omitted or used independently to seal off the passageway 16 through the housings 10, 12 in other embodiments.

In some applications, the pressure in the recesses 30, 31 entering from the second end 24 of the passageway 16 is higher than the pressure entering from the first end 22 of the passageway 16. This pressure differential advantageously causes the centering element 42 to deform and press against the wall of the recess 30 and the wall of the glass plug 18, thereby creating a pressure energized seal. In some embodiments, one or more holes or annular channels 43 are formed on the outer surface of the high pressure side of the centering element 42. These holes or channels 43 facilitate the deformation of the centering element 42 and the formation of the seal between the centering element 42 and the walls of the recess 30 and the glass plug 18. Additionally, the perforated washer 40 enables pressurized fluid to fill the centering element 42 for providing the energized seal.

Preferably, force transferred through the perforated washer 40 biases the centering element 42 into the recess 30. The second stack of Belleville washers 38 pressed by the backstop sleeve 36 supplies the preloading force to the perforated washer 40. The second stack of Belleville washers 38 allow a maximum pressure force to act on the centering element 42 such that pressure of the centering element 42 against the wall of the glass plug 18 does not override force being put on the glass plug 18 to press the tapered surface 50 against the seat 51.

Embodiments of the feedthrough assembly 100 are capable of performing in temperature environments of between −50° C. and 300° C. Additionally, differential pressures up to about 30 kpsi can be applied across the feedthrough seal and maintained without leakage across the seal. The pressure rating of the housing should be about the same as the seal, but depends on the exact application.

Embedding Diagnostic Sensors

Figure 2:
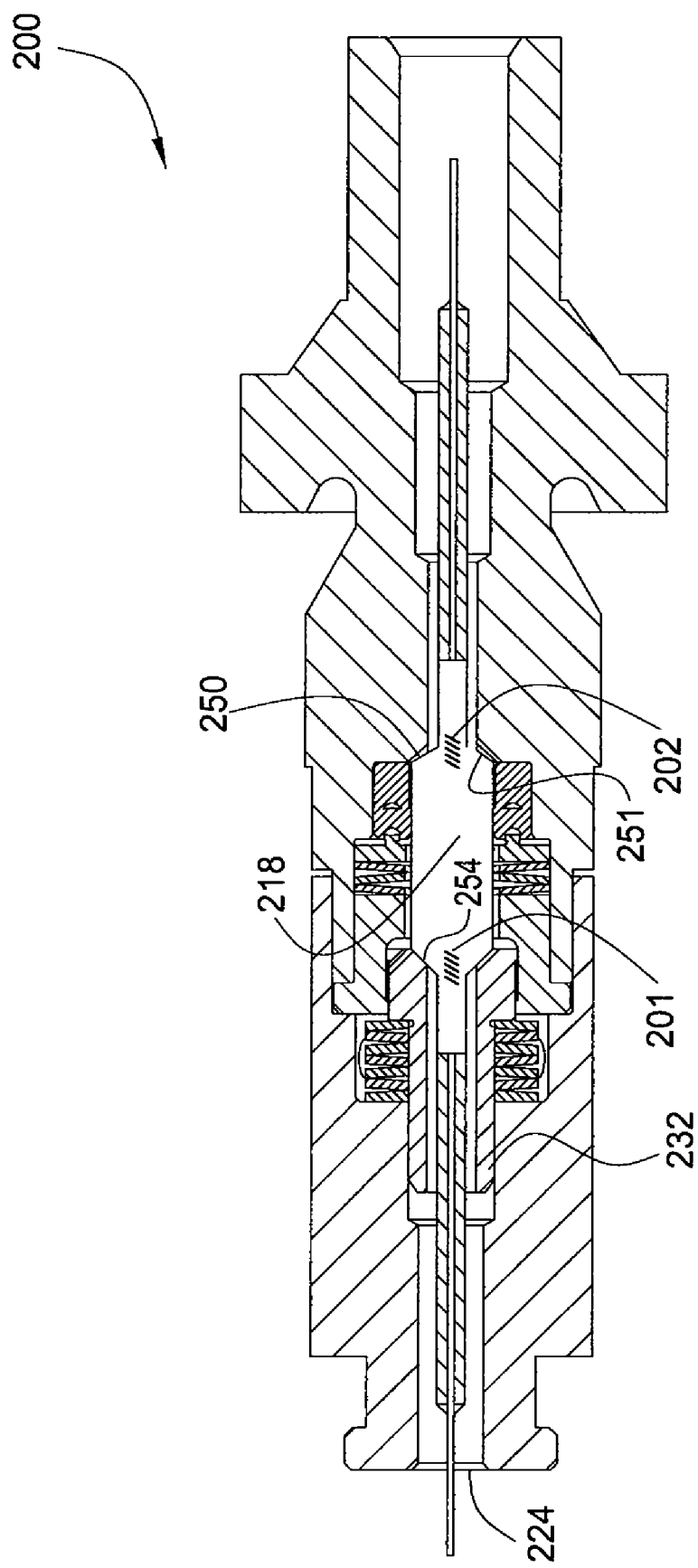
FIG. 2 illustrates a cross section view of an optical waveguide feedthrough assembly having diagnostic sensors disposed therein.

FIG. 2 illustrates a cross section view of an optical waveguide feedthrough assembly 200 that operates similar to the feedthrough assembly 100 shown in FIG. 1. However, the feedthrough assembly 200 includes first and second diagnostic sensors 201, 202 disposed within a glass plug 218. The diagnostic sensors 201, 202 can include any optical sensing element, such as fiber Bragg gratings, capable of reflecting or transmitting an optical signal in response to a parameter being measured. The first diagnostic sensor 201 is disposed within the glass plug 218 proximate an interface 254 where a plunger 232 pushes on the glass plug 218. The second diagnostic sensor 202 is disposed within the glass plug 218 proximate where a tapered surface 250 of the glass plug 218 mates with a seat 251. Preferably, each of the diagnostic sensors 201, 202 span a length of the glass plug 218 across the respective feature that the sensor is proximate.

Interpreting the signals generated by the sensors 201, 202, such as by use of a suitable algorithm or comparison to a calibration, enables monitoring of temperature and/or pressure. This detection ability allows real-time monitoring of the state of the feedthrough assembly 200. Information derived from the sensors 201, 202 can be beneficial both during fabrication of the feedthrough assembly 200 and during use thereof. For diagnostic purposes, signals received from the second sensor 202 can be monitored to identify when and/or if proper contact of the tapered surface 250 with the seat 251 occurs to ensure that sealing is established or maintained. Further, monitoring one or both the sensors 201, 202 can ensure that excess force that might break the glass plug 218 is not applied to the glass plug 218 in embodiments where the amount of force can be controlled. Monitoring signals received from the first sensor 201 can detect the presence and condition of hydrostatic loads from surrounding fluid since these hydrostatic loads dominate the response of the first sensor 201. When the feedthrough assembly 200 is part of a wellhead outlet of an oil/gas well, the sensors 201, 202 can be used to detect pressure increases and set an alarm indicating that seals have been breached in the well.

Figure 3:
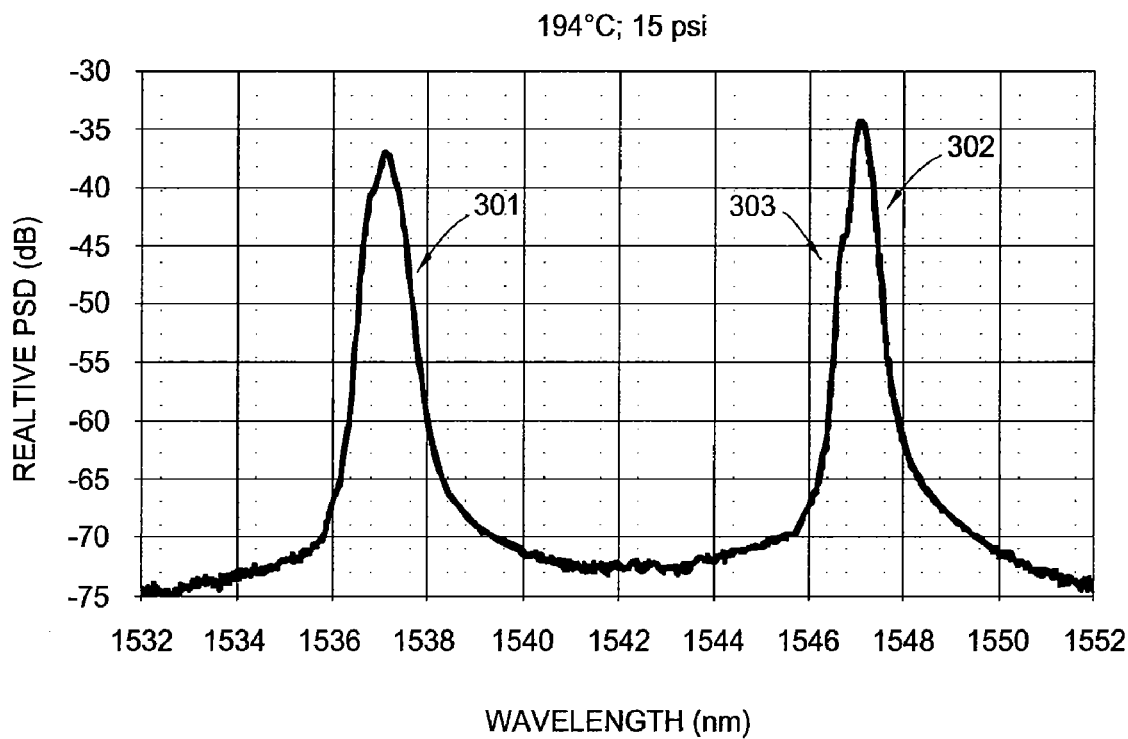
FIGS. 3-5 illustrate graphs of signals received from the diagnostic sensors where the feedthrough assembly is at a fixed temperature and different pressure for each graph.
Figure 4:
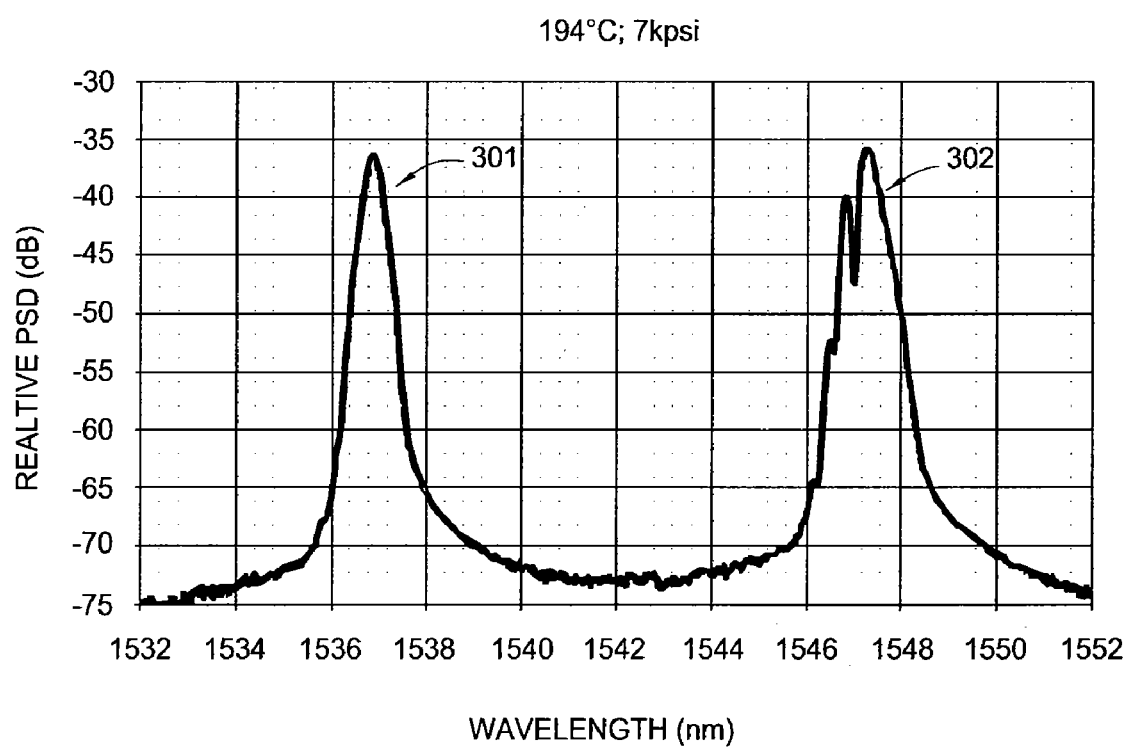
Figure 5:
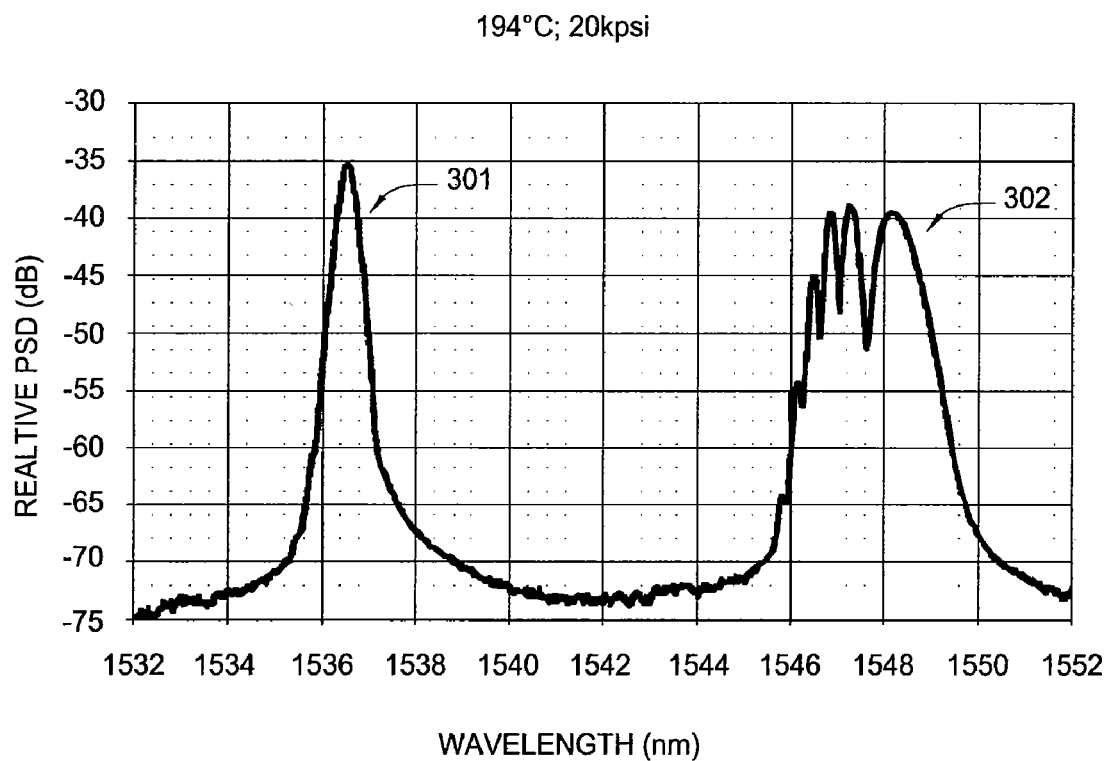

FIGS. 3-5 illustrate graphs of signals received from the diagnostic sensors 201, 202 where the feedthrough assembly 200 is at a fixed temperature but has different pressures introduced at end 224 for each graph. In all of the graphs herein, first sensor responses 301 correspond to signals received from the first sensor 201 while second sensor responses 302 correspond to signals received from the second sensor 202. In FIG. 3, an initial distortion or spreading of the second sensor response 302 visible specifically as a spectral chirp 303, providing positive feedback that preload of the glass plug 218 at the tapered surface 250 against the seat 251 has been established.

As visible in FIGS. 4 and 5, this distortion in the second sensor responses 302 grows relative to pressure due to non-uniform seal loads. However, the first sensor responses 301 show little change as pressure increases since uniform hydrostatic pressure dominates the first sensor 201. Additionally, the first sensor responses 301 provide an indication of a thermo-mechanical state of the housing of the feedthrough assembly 200 and a small pressure driven change in the preload of the plug 218.

Figure 6:
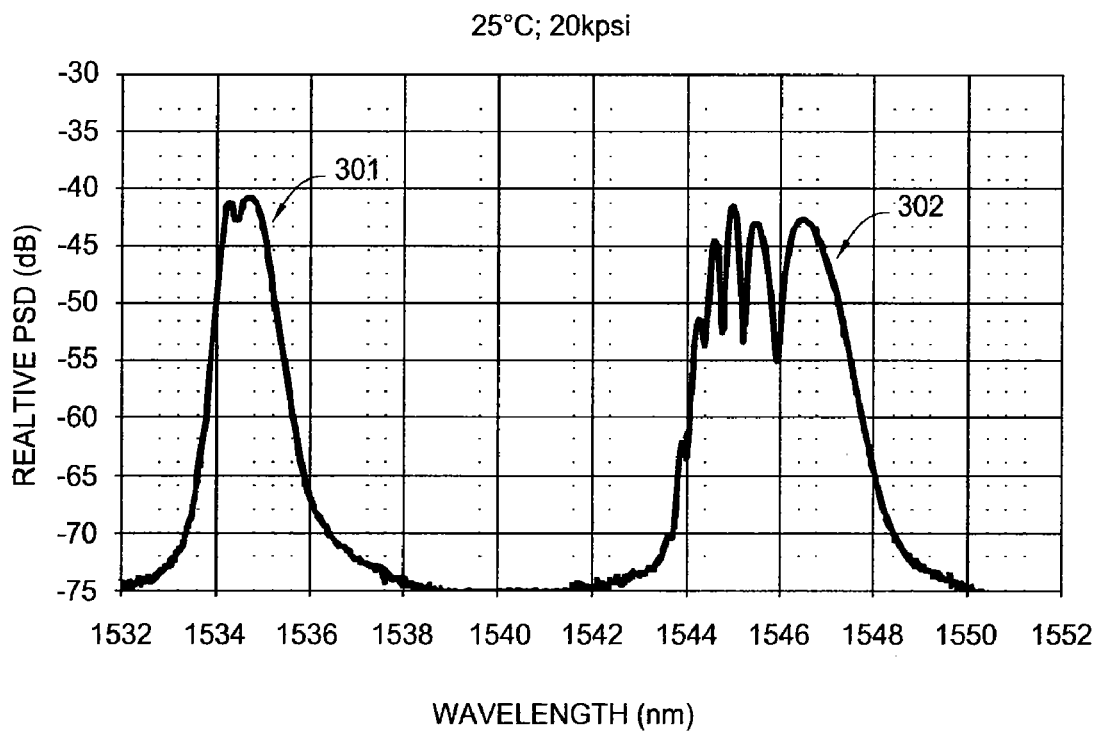
FIGS. 6-8 illustrate graphs of signals received from the diagnostic sensors where the feedthrough assembly is at a fixed pressure and different temperature for each graph.
Figure 7:
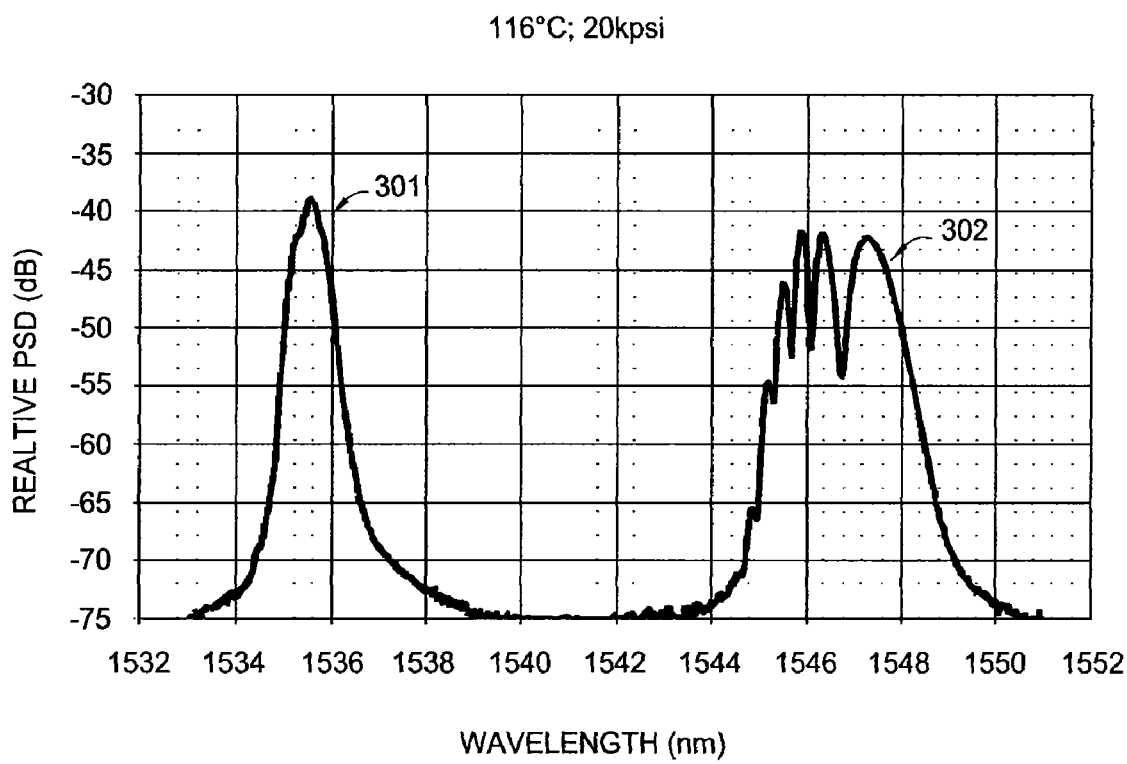
Figure 8:
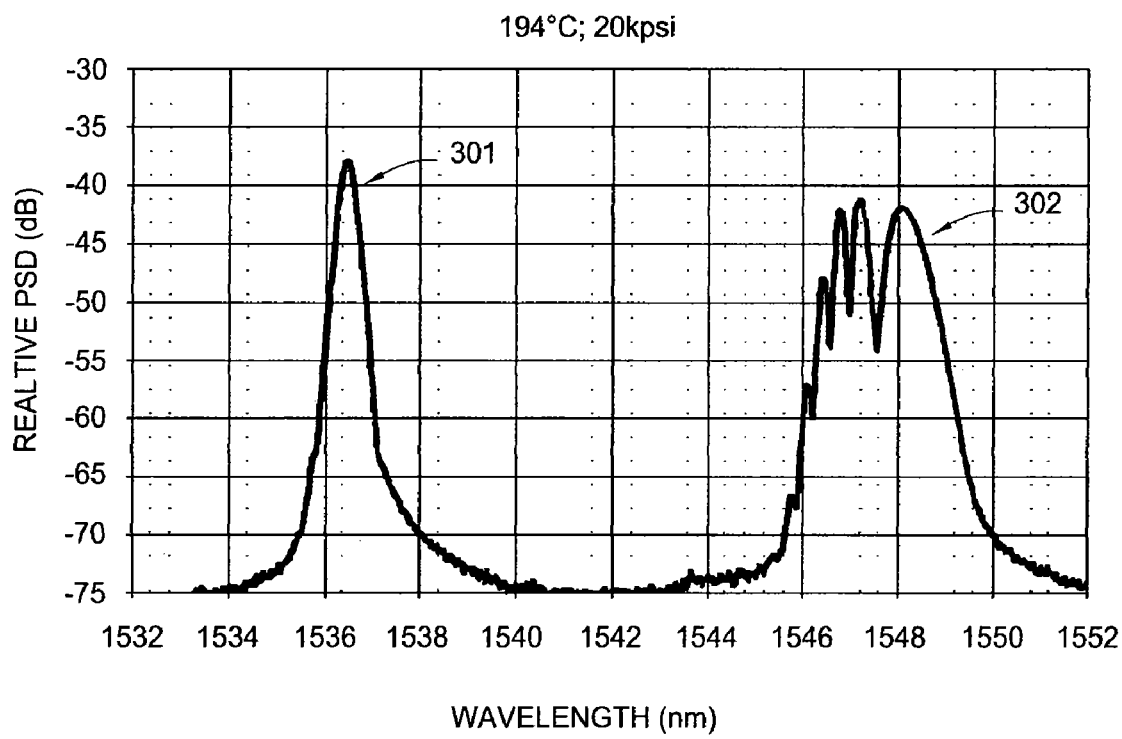

FIGS. 6-8 show graphs of signals received from the diagnostic sensors 201, 202 where the feedthrough assembly 200 is at a fixed pressure but is at a different temperature for each graph. The graphs show that as temperature increases both of the responses 301, 302 shift in wavelength relative to the temperature increase in the same direction. For example, the peak at approximately 1534.5 nanometers (nm) in the first responses 301 at 25° C. shifts to approximately 1536.5 nm at 194° C. Other than small changes from temperature driven changes in the preloads, shapes of the responses 301, 302 do not change with temperature changes.

With reference to FIG. 1, pressure entering the first end 22 of the passageway 16 may be significantly higher than the pressure entering the second end 24 of the passageway 16 in some applications. In this instance, if the higher pressure from the first end 22 exceeds a threshold value, then the seals formed by the seated tapered surface 50 of the glass plug 18 and/or the centering element 42 may be unseated. Accordingly, non-epoxy feedthrough assemblies in some embodiments can be adapted to seal against pressure from either side of a glass plug.

A Bi-Directional Seal Assembly

Figure 9:
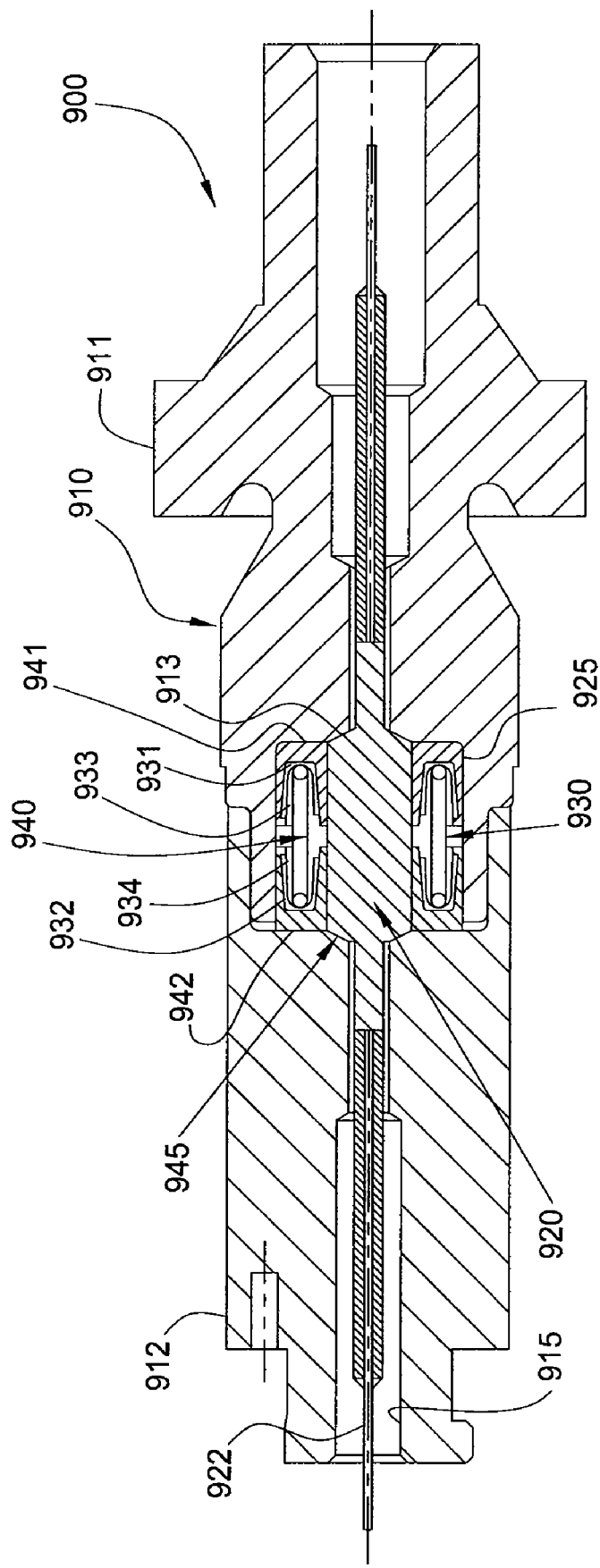
FIG. 9 illustrates a cross section view of an optical waveguide feedthrough assembly that provides bidirectional seal performance.

FIG. 9 shows an exemplary feedthrough assembly 900 having a bi-directional pressurized seal assembly 930. A glass plug 920 forms a waveguide as described herein. The glass plug 920 is cone shaped and is disposed in a recess 925 of a feedthrough housing 910 formed by two body sections 911, 912. The body sections 911, 912 can be coupled together using a weld or various other coupling configurations. A bore 915 sized to accommodate portions of an optical waveguide element 922 on either side of the glass plug 920 extends through the feedthrough housing 910. A tapered seat 913 can be formed on each body section 911, 912 for receiving the glass plug 920. Similar to the embodiment shown in FIG. 1, a gasket member 945 such as an annular gold foil can be disposed between the glass plug 920 and the tapered seats 913 of the body sections 911, 912. The symmetrical configuration of tapered seats 913 in sections 911, 912 creates the primary bidirectional seal design.

In one embodiment, a back-up bi-directional seal assembly 930 is disposed in the recess 925 to provide an additional seal against any leakage from either body section 911, 912. The seal assembly 930 includes two cup-shaped, annular sealing elements 931, 932 and a positioning device 940 to maintain the sealing elements 931, 932 in their respective seal seats 941, 942. The sealing elements 931, 932 are positioned such that their interior portions are opposed to each other and the positioning device 940 may be disposed in the interior portions of the sealing elements 931, 932. The positioning device 940 may comprise a preloaded spring to bias the sealing elements 931, 932 against their respective seal seats 941, 942, or against the body sections 911, 912. In one embodiment, the sealing elements 931, 932 are made of an elastomeric material. The sealing elements 931, 932 can also comprise other suitable flexible materials capable of withstanding high temperature and high pressure.

In operation, if fluid leaks through the tapered surfaces between the glass plug 920 and the first body section 911, then the fluid pressure forces the glass plug 920 against the tapered seat in the body section 912 to activate the reverse direction seal. The fluid pressure will also act against the second sealing element 932, which is biased against the second body section 912. Particularly, the fluid pressure acts on the interior portion of the second sealing element 932 and urges sealing lips 934 of the second sealing element 932 outward, thereby sealing off any fluid path between the second sealing element 932 and the glass plug 920 and between the second sealing element 932 and the body section 911. In this manner, the leaked fluid is prevented from entering the bore of the second body section 912 because of redundant seals.

Similarly, if fluid leaks through the tapered surfaces between the glass plug 920 and the second body section 912, then the fluid pressure forces the glass plug 920 against the tapered seat 913 in body section 911. The fluid pressure will also act against the first sealing element 931 biased against the first body section 911. In this respect, the fluid pressure causes sealing lips 933 of the first sealing element 931 to sealingly engage the glass plug 920 and the body section 911. Thus, the leaked fluid is prevented from entering the bore of the first body section 911 because of redundant seals.

Feedthrough Assembly with Compression Bushing

Figure 10:
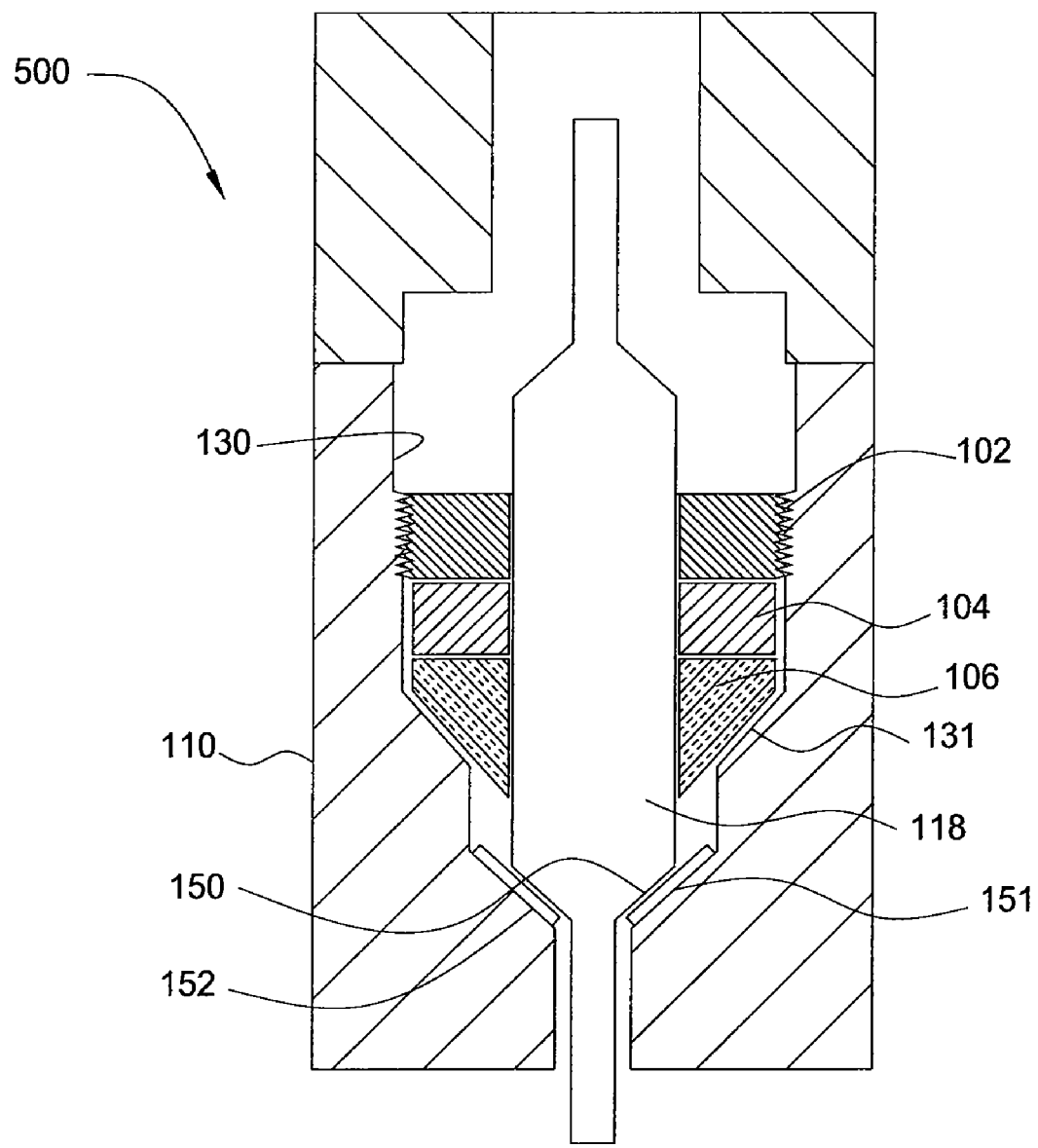
FIG. 10 illustrates a cross sectional view of an optical waveguide feedthrough assembly that includes a compression seal element.

FIG. 10 illustrates a cross sectional view of an optical waveguide feedthrough assembly 500 that includes a housing 110, an externally threaded bushing 102, a compression driver bushing 104, a compression seal element 106, and a glass plug 118 portion of an optical waveguide element that sealingly passes through the housing 110. The bushings 102, 104 and the seal element 106 are disposed adjacent to one another in a recess 130 in the housing 110 and encircle a portion of the glass plug 118. Specifically, the externally threaded bushing 102 threads into a portion of the recess 130 in the housing 110 defining mating internal threads. The seal element 106 is located next to the driver bushing 104 and proximate an inward tapering cone 131 along the recess 130 in the housing 110.

A seal can be established with the glass plug 118 with respect to the housing 110 by driving the seal element 106 down the cone 131. To establish this seal, rotation of the threaded bushing 102 with respect to the housing 110 displaces the threaded bushing 102 further into the recess 130 due to the threaded engagement between the threaded bushing 102 and the housing 110. The driver bushing 104 in turn moves further into the recess and pushes the sealing element 106 toward the cone 131. One function of the driver bushing 104 includes reducing torque transferred to the seal element 106 from the threaded bushing 102.

Preferably, the glass plug 118 has a cone shaped tapered surface 150 for seating against a complimentary tapered seat 151 of the housing 110. The engagement between the tapered surface 150 and the complimentary tapered seat 151 can also or alternatively seal off fluid communication through the housing 110 around the glass plug 118 in a redundant manner. A gasket member 152 such as an annular gold foil can be disposed between the tapered surface 150 of the glass plug 118 and the tapered seat 151 of the housing 110 to reduce stress risers.

Figure 11:
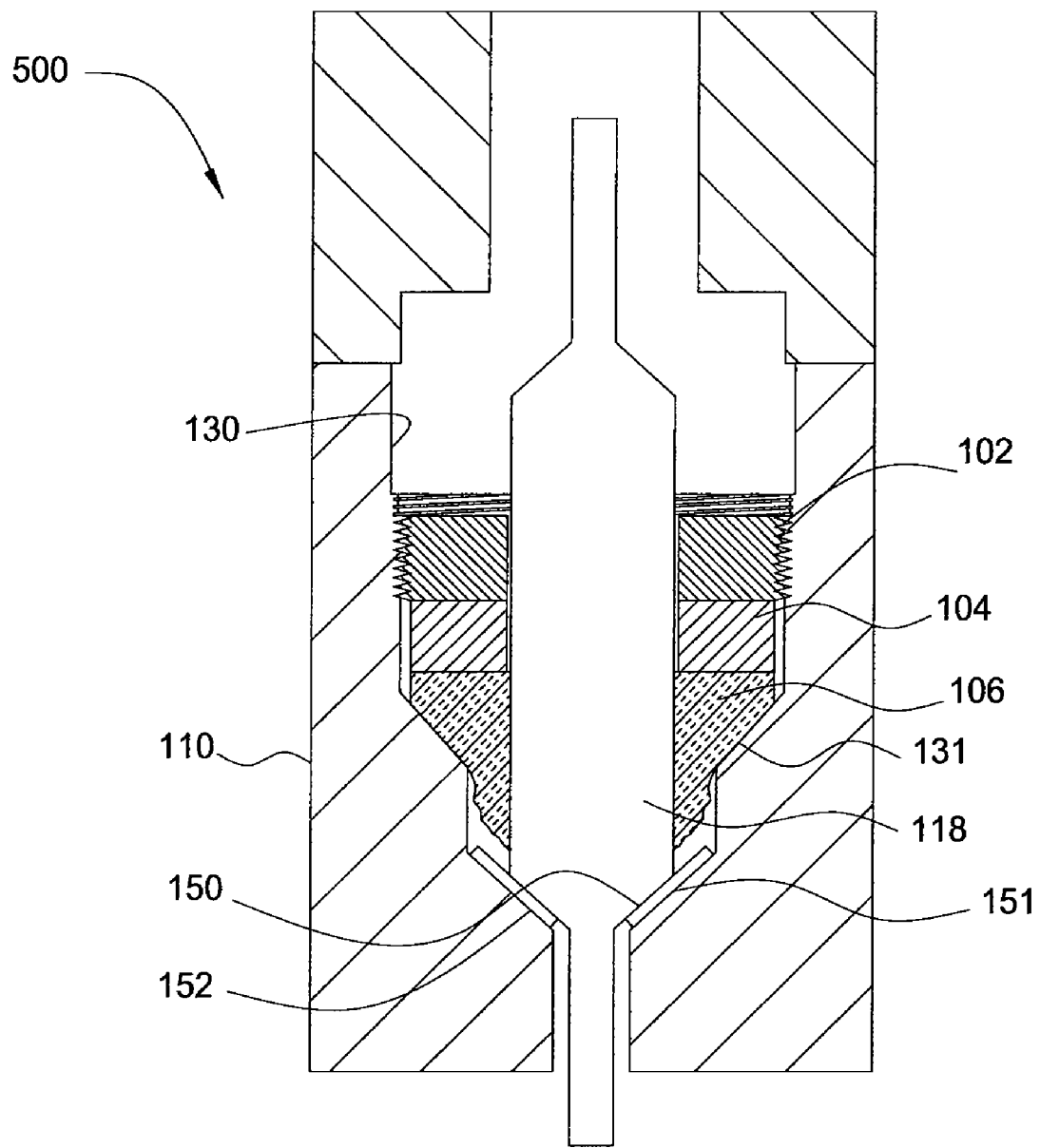
FIG. 11 illustrates the optical waveguide feedthrough assembly shown in FIG. 10 after compression of the compression seal element.

FIG. 11 illustrates the optical waveguide feedthrough assembly 500 after compressing the seal element 106. The seal element 106 packs within an annulus between an exterior of the glass plug 118 and an interior of the housing 110 after being driven down the cone 131. Once packed in the annulus, the seal element 106 provides sealing contact against both the glass plug 118 and the housing 110. Examples of suitable materials for the seal element 106 include TEFLON™, VESPEL™, polyimide, PEEK™, ARLON™, gold or other ductile metals for high temperature applications. During lower temperature usage, element 106 can be nylon, DEL- RIN™ or metal such as tin or lead. The driving of the seal element 106 can additionally move the glass plug 118 to force the tapered surface 150 to mate with the seat 151. The glass plug 118 is of sufficient diameter and structural integrity that the compression of the seal element 106 around the glass plug does not disturb the optical qualities thereof. The feedthrough assembly 500 is capable of sealing the glass plug 118 with respect to the housing 110 regardless of which side of the housing 110 is exposed to a higher pressure.

An Additional Exemplary Feedthrough Assembly

Figure 12:
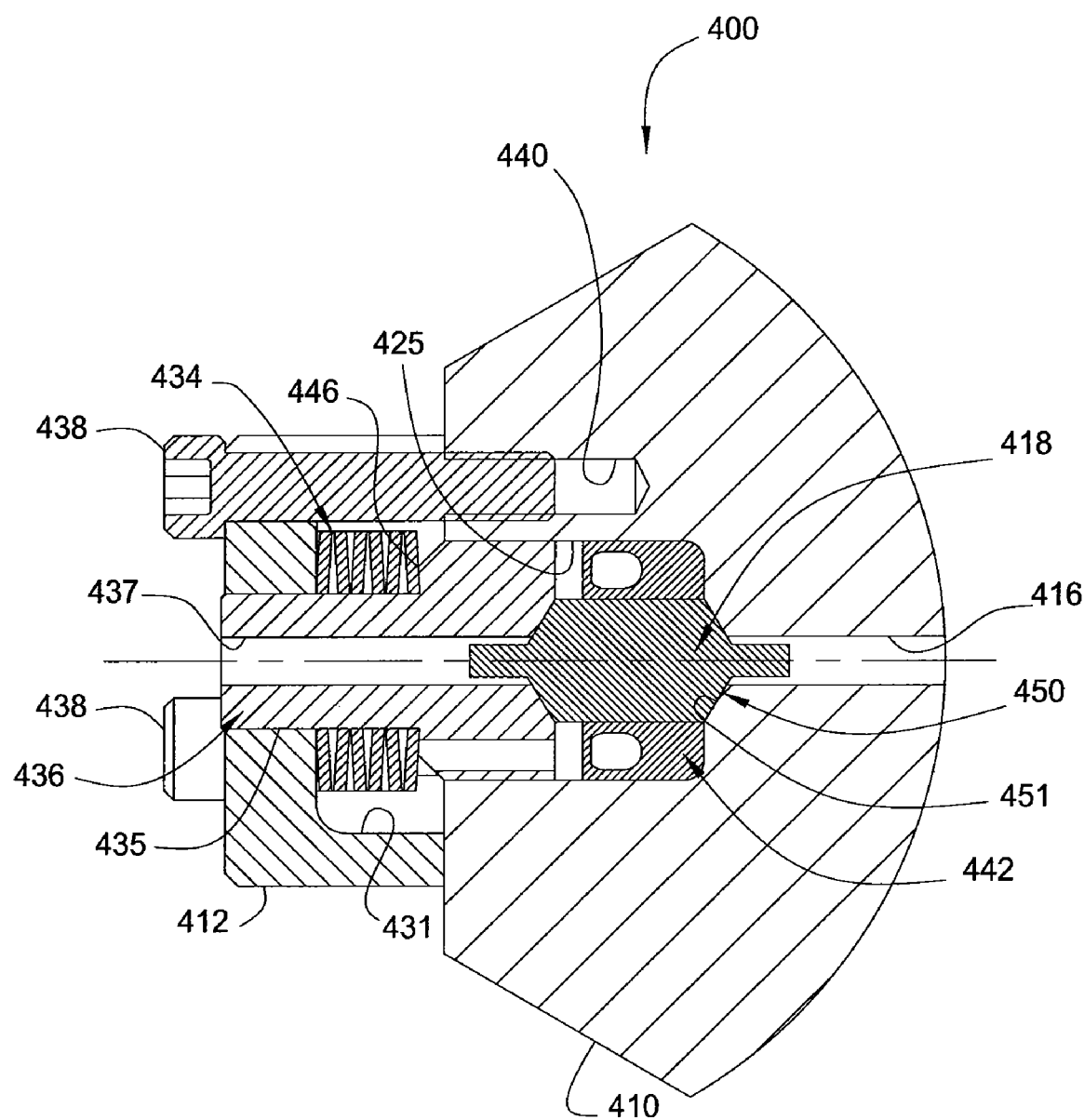
FIG. 12 illustrates a cross section view of another optical waveguide feedthrough assembly.

FIG. 12 shows a cross-section view of a feedthrough assembly 400 that includes a feedthrough housing 410 for retaining a glass plug 418. A recess 425 is formed in one end of the housing 410 to receive the glass plug 418. Preferably, the recess 425 has a corresponding tapered seat 451 for receiving a cone shaped tapered surface 450 of the glass plug 418. The glass plug 418 is preferably biased against the tapered seat 451 that is located along a bore 416 that connects to the recess 425 and provides a passageway through the housing 410.

In one embodiment, a fitting 436 having an axial bore 437 extending therethrough is disposed between the glass plug 418 and a washer cap 412. One end of the fitting 436 has a surface that mates with the glass plug 418 and an outer diameter that is about the same size as the inner diameter of the recess 425. In this respect, the fitting 436 assists with supporting the glass plug 418 in the recess 425. The other end of the fitting 436 has a neck 435 that connects to the washer cap 412. Particularly, a portion of the neck 435 fits in a hole of the washer cap 412. The washer cap 412 may be attached to the feedthrough housing 410 by any manner known to a person of ordinary skill in the art, such as one or more screws or bolts. For example, bolts 438 (two of three are visible in FIG. 12) may be used to attach the washer cap 412 to the feedthrough housing 410 via three screw holes 440 (only one is visible in FIG. 12) formed through the washer cap 412 and into the feedthrough housing 410.

The inner portion of the washer cap 412 facing the feedthrough housing 410 has a cavity 431 for retaining a preload member such as a spring. In one example, the preload member is a Belleville washer stack 434. The washer stack 434 may be disposed on the neck 435 of the fitting 436 and between the washer cap 412 and an outward shoulder 446 formed by a reduced diameter of the neck 435 of the fitting 436. In this manner, the washer stack 434 may exert a preloading force on the glass plug 418 to maintain a seal between the glass plug 418 and the tapered seat 451 of the feedthrough housing 410. Similar to the embodiments described above, a gasket member such as an annular gold foil (not shown) can be disposed between the glass plug 418 and the tapered seats 451 and/or the glass plug 418 and the fitting 436.

The feedthrough assembly 400 may further include a centering element 442 to act as a back-up seal. The centering element 442 comprises an elastomeric sealing component that is disposed between the glass plug 418 and the feedthrough housing 410. A pressure differential across the glass plug 418 advantageously causes the centering element 442 to deform and press against the wall of the recess 425 and the wall of the glass plug 418, thereby creating a pressure energized seal. Although the centering element 442 is described as providing a back up seal, the centering element 442 may be used independently to seal off the bore 416 of the feedthrough housing 410.

Additional Bi-Directional Seal Assemblies

Figure 13:
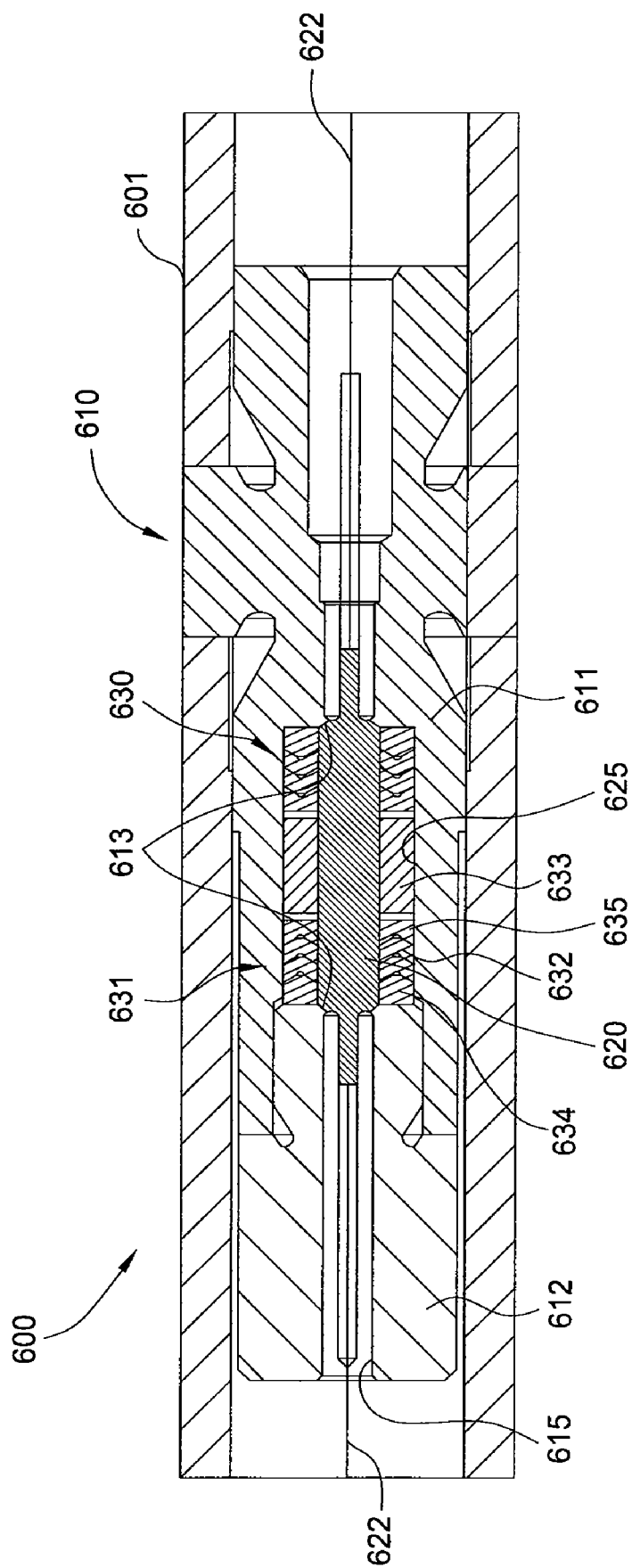
FIG. 13 illustrates a cross section view of an optical waveguide feedthrough assembly that provides bidirectional seal performance utilizing first and second sets of multiple v-ring seals with the sets oriented in opposing directions.

FIG. 13 illustrates an optical waveguide feedthrough assembly 600 interfaced with tubing 601 and that provides bi-directional seal performance similar to the assembly 900 shown in FIG. 9. The feedthrough assembly 600 includes a glass plug 620 disposed in a recess 625 of a feedthrough housing 610 formed by first and second body sections 611, 612 coupled together using a weld for example. A bore 615 sized to accommodate portions of an optical waveguide element 622 on either side of the glass plug 620 extends through the feedthrough housing 610. As with other embodiments described herein, the glass plug 620 includes a core and a cladding and may be fused to a section (e.g., a length of optical fiber) of the waveguide element 622 with a relatively smaller cladding outer diameter such that material forming the glass plug 620 and the section of the waveguide element 622 with the smaller outer diameter is continuous and adjoined without any break. Further, the glass plug 620 may be retained within the recess 625 by a tapered mating 613 between the glass plug 620 and each of the body sections 611, 612 of the housing 610. The glass plug 620 may lack any affixing to the housing 610 or preloading against the housing 610 such that the glass plug 620 is freely moveable within where retained. For some embodiments, the tapered mating 613 may not form a seal but rather only prevent ejection through the bore 615 of the glass plug 620 from the recess 625 due to any pressure differential across the feedthrough assembly 600.

The feedthrough assembly 600 also includes first and second sets 630, 631 of multiple chevron or v-ring seals 632 with the sets 630, 631 oriented in opposing directions from one another. The sets 630, 631 surround the glass plug 620 within the recess 625 and provide sealing at distal lips of the v-ring seals 632 with an outside surface of the glass plug 620 and an inside surface of the housing 610 along the recess 625. The v-ring seals 632 of the first set 630 open toward and receive force from fluid pressure entering the feedthrough assembly 600 through the first body section 611 while the second set 631 open toward and receive force from fluid pressure entering the feedthrough assembly 600 through the second body section 612. The fluid pressure acts to urge the lips of the v-ring seals 632 into sealing engagement with respective surfaces, thereby sealing pressures from both sides of the feedthrough assembly 600.

A spacer 633 separates the first and second sets 630, 631 in embodiments where the v-ring seals 632 do not occupy all of the length of the glass plug 620 within the recess 625 of the housing 610. In addition, each of the sets 630, 631 may include a male end ring 634 and a female end ring 635 to aid in holding and stabilizing the v-ring seals 632 disposed between the end rings 634, 635. The end rings 634, 635 fill voids or adapt any surrounding surface shapes to that of the v-ring seals 632.

Exemplary materials for the multiple v-ring seals 632 within each of the sets 630, 631 include fluoroelastomers, silicones, thermoplastics, polyetheretherketone, polyimide and polytetrafluoroethylene. Further, materials such as polyetheretherketone and polytetrafluoroethylene may include fillers, such as glass, carbon (graphite), or molybdenum fillers. Selection of the material for the v-ring seals 632 depends on pressures and temperatures anticipated for a working range of the feedthrough assembly 600. The material may vary from one of the v-ring seals 632 to another in order to achieve the working range desired as discussed further with respect to FIG. 15. For example, a first thermoplastic that is more rigid than a second thermoplastic enables sealing at higher temperatures/pressures than the second thermoplastic that is relatively softer and more compliant and better suited for lower temperatures/pressures. By having a plurality of the v-ring seals 632 within each of the sets 630, 631, redundant sealing occurs. The same material as the v-ring seals 632 or a different material such as metal may form the end rings 634, 635.

The v-ring seals 632 lack any bonding to the glass plug 620 or the housing 610 such that the v-ring seals 632 are movable relative to the glass plug 620 and the housing 610, thereby relieving stress at sealing interfaces. Such relative movement may occur during heating or cooling of the feedthrough assembly 600 as a result of differences in thermal expansion rates and does not inhibit sealing capabilities of the v-ring seals 632. The v-ring seals 632 function without reliance on a bonded interface that may be broken with such stress at the sealing interfaces.

Figure 14:
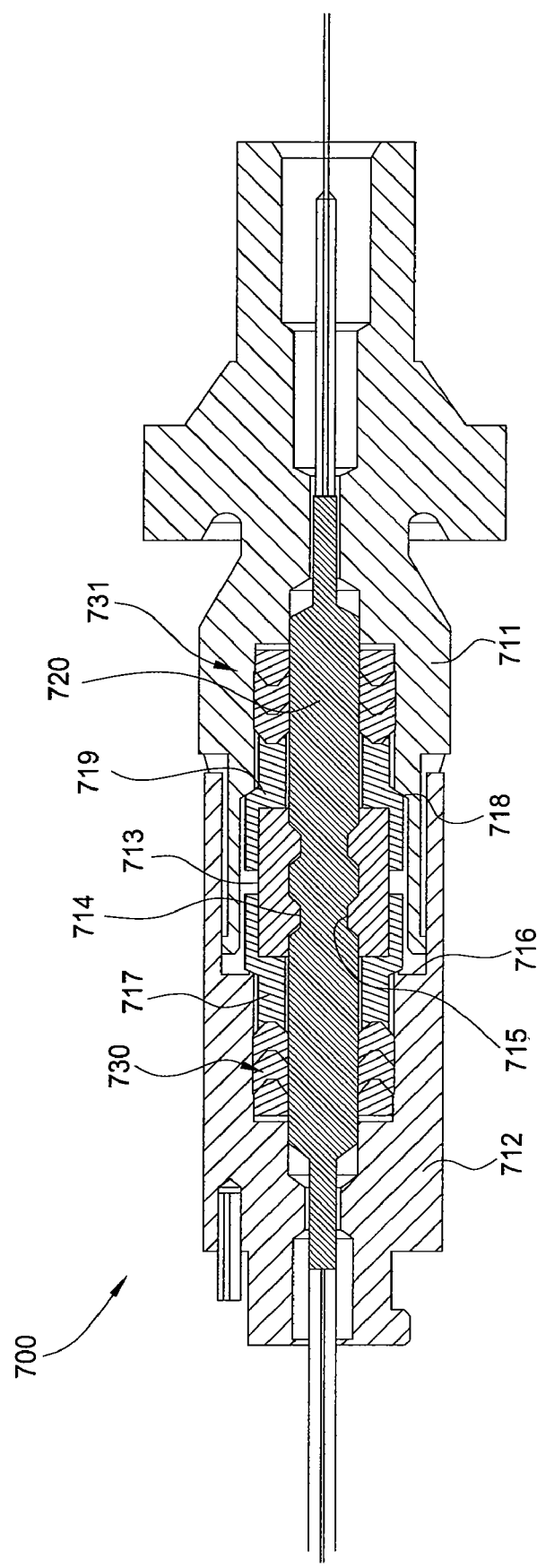
FIG. 14 illustrates a cross section view of an optical waveguide feedthrough assembly including a plurality of v-ring seals and a containment member to trap a glass plug within the feedthrough assembly.

FIG. 14 shows an optical waveguide feedthrough assembly 700 including first and second v-ring sealing sets 730, 731. Without repeating operational details, sealing of a glass plug 720 within first and second body sections 711, 712 thus may occur as described herein. The feedthrough assembly 700 further includes a containment member 713 to trap the glass plug 720 within the feedthrough assembly 700. In some embodiments, the containment member 713 defines a clam shell configuration to enable its placement around the glass plug 720. At least one notch 714 machined into an outer surface of the glass plug 720 mates with a corresponding dog 715 of the containment member 713. The dog 715 forms a projection along an inside diameter of the containment member 713.

Mating interlocked profiles or features such as the notch 714 and the dog 715 may vary in geometry, size and quantity while still engaging one another to retain the glass plug 720 relative to the containment member 713. The containment member 713 enables multiple loading locations and distribution of the loading locations along a length of the glass plug 720 so that forces applied to the glass plug 720 by any pressure differentials across the feedthrough assembly 700 are not concentrated at any one point. This distribution of stress may benefit service life of the feedthrough assembly 700 by inhibiting initiation and acceleration of crack growth within the glass plug 720. The containment member 713 may further aid in alleviating stress on the glass plug 720 by being made of a material (e.g., polyetheretherketone) that provides a softer landing relative to the body sections 711, 712 of the feedthrough assembly 700, for example.

The body sections 711, 712 of the feedthrough assembly 700 trap the containment member 713 via first and second inward facing shoulders 716, 718. For example, first and second intermediary spacers 717, 719 may receive an outside of the containment member 713 at respective ends thereof and also include portions with an outer dimension greater than the inward facing shoulders 716, 718 between which the portions of the spacers 717, 719 are disposed. The first intermediary spacer 717 extends toward the first v-ring sealing set 730 and includes a female end face to support the first v-ring sealing set 730. Likewise, the second intermediary spacer 719 extends toward the second v-ring sealing set 731 and includes a female end face to support the second v-ring sealing set 731.

Figure 15:
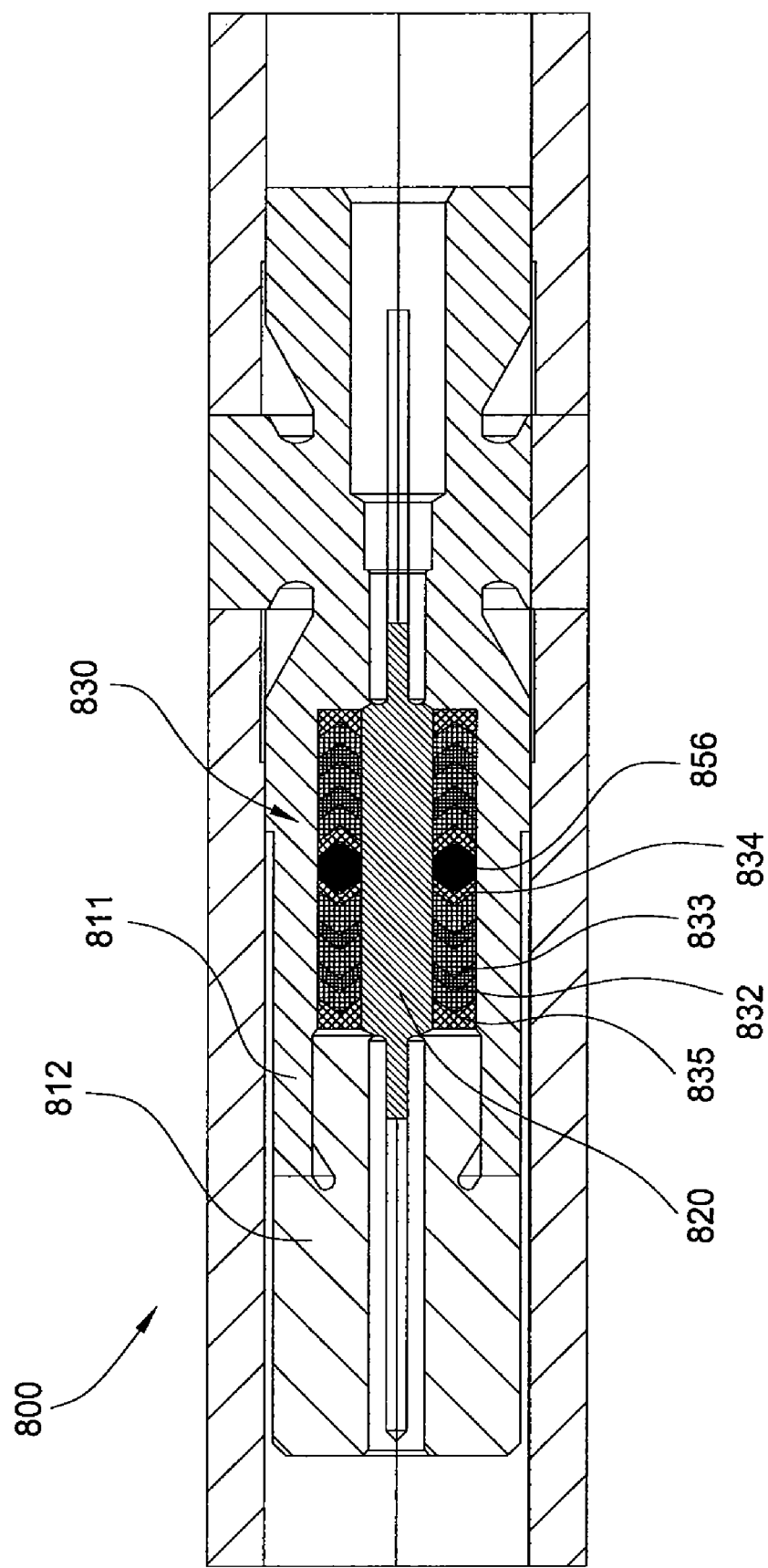
FIG. 15 illustrates a cross section view of an optical waveguide feedthrough assembly that provides bi-directional seal performance utilizing v-ring seals open towards an o-ring seal on each side of the o-ring seal.

FIG. 15 illustrates an optical waveguide feedthrough assembly 800 depicting an exemplarily configuration of a seal stack 830. Analogous to the feedthrough assembly 600 shown in FIG. 6, the seal stack 830 engages and seals a glass plug 820 within body sections 811, 812 of the feedthrough assembly 800. The seal stack 830 includes an optional o-ring 856 that is made of, for example, a fluoroelastomer and enables lowest temperature/pressure sealing within the seal stack 830. In a mirror image arrangement starting from closest to the o-ring 856, the seal stack 830 additionally includes male ring adapters 834, alternating first and second v-rings 832, 833 and female ring adapters 835. The first v-ring seals 832 provide sealing at a highest temperature/pressure using the seal stack 830 and may be made of polyetheretherketone. The second v-ring seals 833 provide sealing at an intermediate temperature/pressure using the seal stack 830 and may be made of polytetrafluoroethylene. At the intermediate temperature/pressure, the first v-ring seals 832 limit creep/extrusion of the second v-ring seals 833. The adapters 834, 835 that may be made of metal thus limit creep/extrusion of the first v-ring seals 832 at the highest temperature/pressure sealed using the seal stack 830.

The invention heretofore can be used and has specific utility in applications within the oil and gas industry. Further, it is within the scope of the invention that other commercial embodiments/uses exist with one such universal sealing arrangement shown in the figures and adaptable for use in (by way of example and not limitation) industrial, chemical, energy, nuclear, structural, etc. While the foregoing is directed to preferred embodiments of the invention, other and further embodiments of the invention may be devised without departing from the basic scope thereof, and the scope thereof is determined by the claims that follow.

What is claimed is:

1. An optical waveguide feedthrough assembly, comprising:
    a housing having a bore extending therethrough;
    a glass plug forming an optical waveguide element having a core and cladding, wherein the glass plug is disposed in the bore and has a cladding outer diameter with a profile defining sections with at least two different diameters;
    a first sealing element disposed around a first section of the glass plug, wherein the first sealing element has sealing lips oriented to be energized into sealing engagement with the bore and the glass plug by fluid pressure acting in a first direction within the bore; and
    a second sealing element disposed around the first section of the glass plug, wherein the second sealing element has sealing lips oriented to be energized into sealing engagement with the bore and the glass plug by fluid pressure acting in a second direction opposite the first direction within the bore.

2. The assembly of claim 1, wherein each of the first and second sealing elements comprise a plurality of v-ring seals.

3. The assembly of claim 2, wherein the v-ring seals are made of a thermoplastic.

4. The assembly of claim 2, wherein the v-ring seals are arranged such that the v-ring seals made of a first material alternate with the v-ring seals made of a second material different than the first material.

5. The assembly of claim 4, wherein at common conditions the first material is more rigid than the second material.

6. The assembly of claim 1, wherein the second section comprises an optical fiber.

7. The assembly of claim 1, wherein the first and second sections of the waveguide element are fused together.

8. The assembly of claim 1, wherein the sealing elements are moveable relative to the optical waveguide element and the housing.

9. The assembly of claim 1, wherein none of the waveguide element, the sealing elements and the housing are bonded together.

10. The assembly of claim 1, wherein the optical waveguide element has first and second convex frustoconical sections seated within complimentary concave frustoconical sections along the bore.

11. The assembly of claim 1, further comprising a containment member secured within the housing, wherein the containment member has corresponding features mated with a profile of the cladding outer diameter where the optical waveguide element has portions with at least two different diameters.

12. An optical waveguide feedthrough assembly, comprising:
   a housing having a bore extending therethrough;
   a glass plug forming an optical waveguide element having a core and cladding, wherein the glass plug is disposed in the bore and has a cladding outer diameter with a profile defining sections with at least two different diameters;
   a sealing element disposed around a first section of the glass plug and in sealing engagement with the bore and the glass plug; and
   a containment member secured within the housing, wherein the containment member has corresponding features mated with the profile of the glass plug.

13. The assembly of claim 12, wherein the sealing element comprises a plurality of v-ring seals.

14. The assembly of claim 12, wherein the sealing element comprises a first plurality of v-ring seals oriented in an opposite direction from a second plurality of v-ring seals.

15. The assembly of claim 12, wherein the containment member defines a clam shell made of a thermoplastic.

16. The assembly of claim 12, wherein the containment member is secured within the housing between inward facing shoulders of the housing.

17. An optical waveguide feedthrough assembly, comprising:
   a housing having a bore extending therethrough;
   an optical waveguide element having a core and cladding at a first section with a larger cladding outer diameter than a second section, wherein the first section is disposed in the bore; and
   v-ring seals disposed around the first section of the optical waveguide, wherein a first plurality of the v-ring seals are oriented in an opposite direction from a second plurality of the v-ring seals.

18. The assembly of claim 17, further comprising an o-ring seal disposed between the first plurality of the v-ring seals and the second plurality of the v-ring seals.

19. The assembly of claim 17, further comprising a containment member secured within the housing, wherein the containment member has corresponding features mated with a profile of the cladding outer diameter where the optical waveguide element has portions with at least two different diameters.

20. The assembly of claim 17, wherein the v-ring seals are arranged such that the v-ring seals made of polyetheretherketone alternate with the v-ring seals made of polytetrafluoroethylene.

* * * * *